United States Patent
Curtis et al.

(10) Patent No.: US 10,402,039 B2
(45) Date of Patent: *Sep. 3, 2019

(54) ADAPTIVE USER INTERFACE USING MACHINE LEARNING MODEL

(71) Applicant: Facebook, Inc., Menlo Park, CA (US)

(72) Inventors: Michael Curtis, Palo Alto, CA (US);
John Fremlin, San Francisco, CA (US);
Shashank Pandit, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 15/197,323

(22) Filed: Jun. 29, 2016

(65) Prior Publication Data

US 2016/0306506 A1    Oct. 20, 2016

Related U.S. Application Data

(63) Continuation of application No. 13/612,554, filed on Sep. 12, 2012, now Pat. No. 9,405,427.

(51) Int. Cl.

| | |
|---|---|
| *G06F 3/048* | (2013.01) |
| *G06F 3/01* | (2006.01) |
| *G06N 20/00* | (2019.01) |
| *G06F 3/0481* | (2013.01) |
| *H04L 12/24* | (2006.01) |
| *G06Q 50/00* | (2012.01) |

(52) U.S. Cl.
CPC .......... *G06F 3/0481* (2013.01); *G06N 20/00* (2019.01); *H04L 41/22* (2013.01); *G06Q 50/01* (2013.01)

(58) Field of Classification Search
CPC ........ G06Q 30/00; G06Q 50/01; G06F 17/00; G06F 17/30; G06F 3/048; G06F 3/00; G06F 16/00; G06N 20/00
See application file for complete search history.

(56) References Cited

U.S. PATENT DOCUMENTS

| | | | |
|---|---|---|---|
| 7,792,661 B1 | 9/2010 | Cooley et al. | |
| 8,055,749 B1 | 11/2011 | Paleja et al. | |
| 8,160,909 B2 | 4/2012 | Voda et al. | |
| 8,166,155 B1 * | 4/2012 | Rachmeler | G06F 17/3089 709/224 |
| 8,185,608 B1 * | 5/2012 | York | G06Q 30/02 709/203 |
| 8,230,089 B2 | 7/2012 | Wehmann et al. | |

(Continued)

OTHER PUBLICATIONS

Final Office Action dated Oct. 22, 2014, for U.S. Appl. No. 13/612,554, of Curtis, M., filed Sep. 12, 2012.

(Continued)

*Primary Examiner* — Hugo Molina
(74) *Attorney, Agent, or Firm* — Baker Botts L.L.P.

(57) ABSTRACT

Techniques for social networking systems and methods for testing and applying user interfaces are disclosed herein. The method includes steps of presenting a user interface including a new user interface feature to a group of test users, collecting response data from the test users experiencing the user interface, performing analytics on the response data, and determining at least one interface rule of applying user interface features for a user depending on one or more user attributes of the user based on the analytics using a machine learning model.

15 Claims, 13 Drawing Sheets

(56) References Cited

U.S. PATENT DOCUMENTS

| | | | |
|---|---|---|---|
| 8,234,632 B1 | 7/2012 | Meyer et al. | |
| 8,359,238 B1 | 1/2013 | Kauchak et al. | |
| 8,843,853 B1* | 9/2014 | Smoak | G06F 3/0482 715/839 |
| 9,405,427 B2 | 8/2016 | Curtis et al. | |
| 2005/0044508 A1 | 2/2005 | Stockton et al. | |
| 2006/0085181 A1 | 4/2006 | Komamura et al. | |
| 2006/0156326 A1 | 7/2006 | Goronzy et al. | |
| 2007/0061488 A1* | 3/2007 | Alagappan | G06F 16/9577 709/246 |
| 2007/0100688 A1 | 5/2007 | Book et al. | |
| 2007/0124192 A1 | 5/2007 | Moatti et al. | |
| 2007/0300185 A1* | 12/2007 | Macbeth | G06F 9/451 715/825 |
| 2008/0027924 A1 | 1/2008 | Hamilton et al. | |
| 2008/0077865 A1 | 3/2008 | Hiles et al. | |
| 2008/0097829 A1* | 4/2008 | Ritter | G06Q 30/02 705/14.1 |
| 2008/0228537 A1* | 9/2008 | Monfried | G06Q 30/02 705/14.53 |
| 2008/0275980 A1 | 11/2008 | Hansen et al. | |
| 2008/0288328 A1 | 11/2008 | Minor et al. | |
| 2009/0094555 A1 | 4/2009 | Viitala et al. | |
| 2010/0010865 A1 | 1/2010 | Dyer et al. | |
| 2010/0049584 A1* | 2/2010 | Mehta | G06Q 30/02 705/14.45 |
| 2010/0138370 A1* | 6/2010 | Wu | G06F 17/30702 706/12 |
| 2010/0185630 A1 | 7/2010 | Cheng et al. | |
| 2010/0275138 A1 | 10/2010 | Chang et al. | |
| 2011/0214077 A1 | 9/2011 | Singh et al. | |
| 2012/0022938 A1 | 1/2012 | McNea et al. | |
| 2013/0031470 A1* | 1/2013 | Daly, Jr. | G06F 17/30867 715/243 |
| 2013/0036367 A1 | 2/2013 | DeRoos et al. | |
| 2013/0061259 A1 | 3/2013 | Raman et al. | |
| 2013/0152001 A1 | 6/2013 | Lovitt et al. | |
| 2013/0326413 A1 | 12/2013 | Croft et al. | |
| 2014/0075336 A1 | 3/2014 | Curtis et al. | |

OTHER PUBLICATIONS

Non-Final Office Action dated Jul. 31, 2015, for U.S. Appl. No. 13/612,554, of Curtis, M., filed Sep. 12, 2012.

Non-Final Office Action dated Jun. 13, 2014, for U.S. Appl. No. 13/612,554, of Curtis, M., filed Sep. 12, 2012.

Notice of Allowance dated Apr. 26, 2016, for U.S. Appl. No. 13/612,554, of Curtis, M., filed Sep. 12, 2012.

Paras Chopra, "The Ultimate Guide to A/B testing," Jun. 24, 2010, Smashing Magazine, pp. 1-9.

U.S. Appl. No. 13/612,554, of Curtis, M. et al. filed Sep. 12, 2012.

* cited by examiner

| Original user interface (blue submit button) | Test user interface (green submit button) |
|---|---|
| F(male, US) = 56% | F(male, US) = 60% |
| F(female, US) = 52% | F(female, US) = 70% |
| F(male, Canada) = 58% | F(male, Canada) = 55% |
| F(female, Canada) = 56% | F(female, Canada) = 43% |

*FIG. 3*

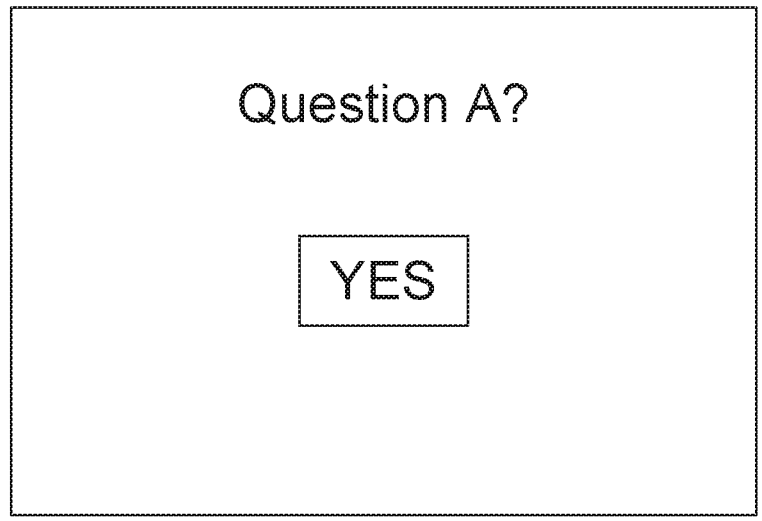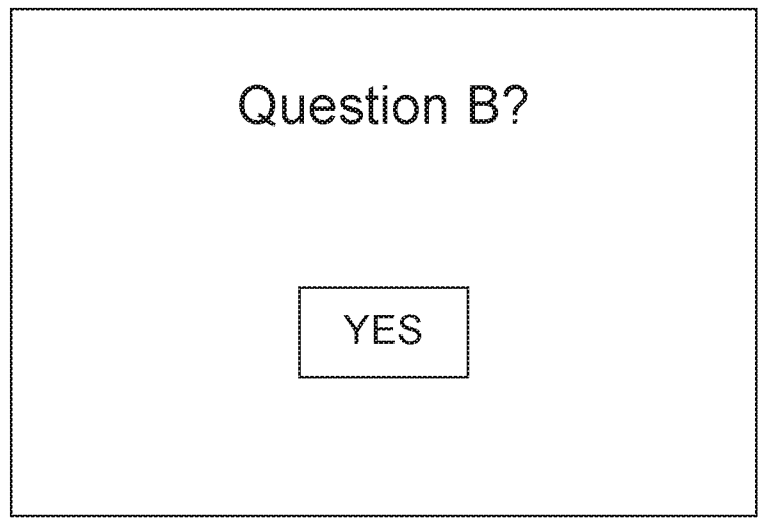
*FIG. 4A*

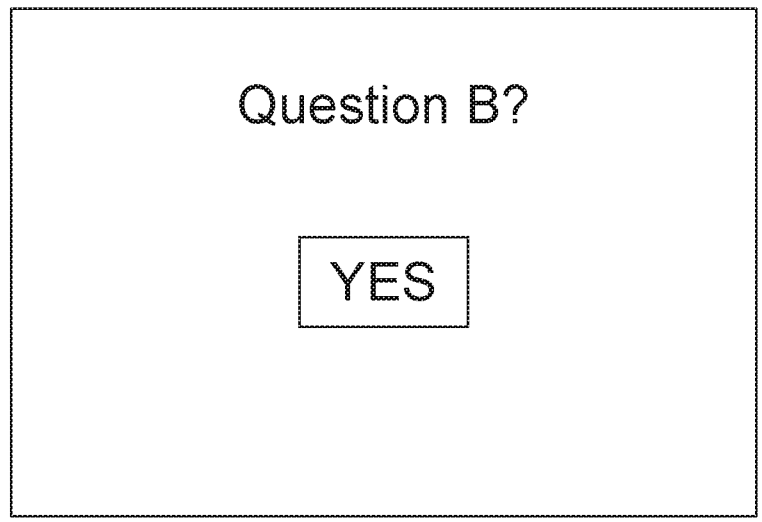
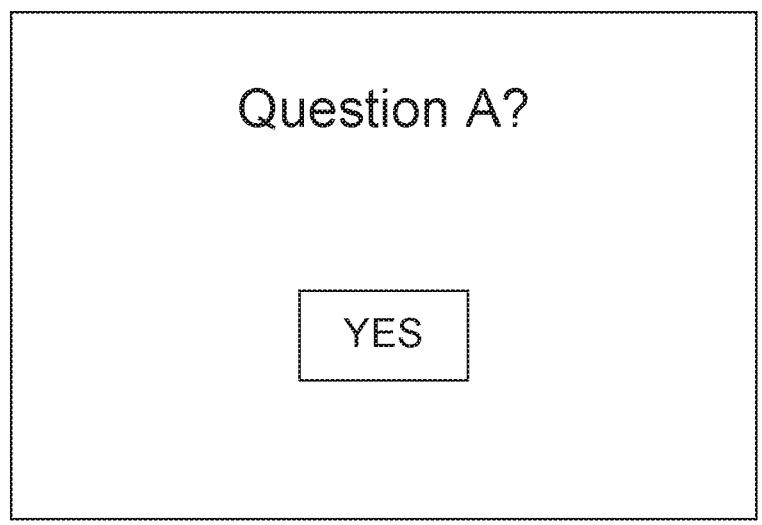
*FIG. 4B*

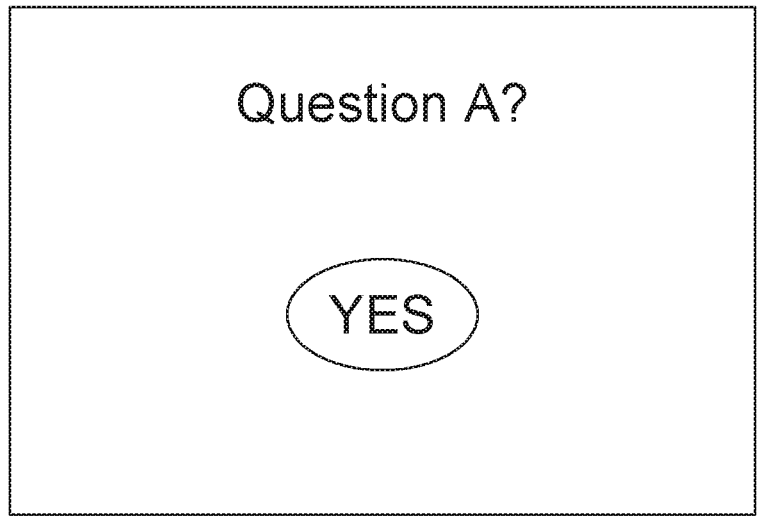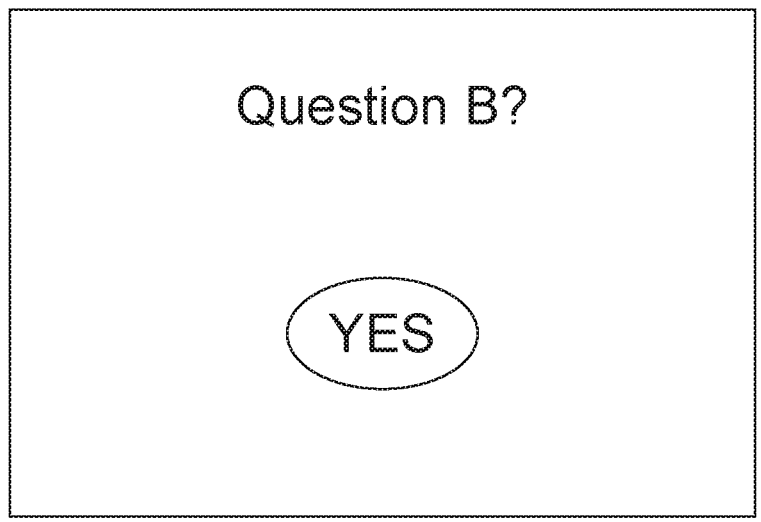
*FIG. 4C*

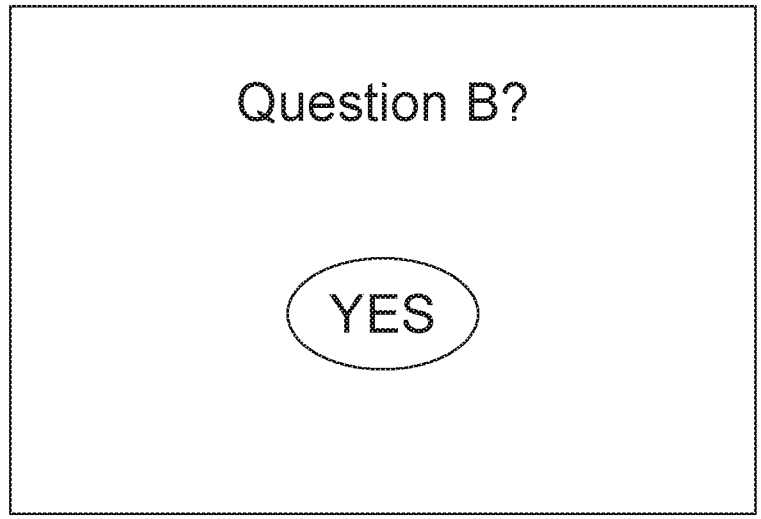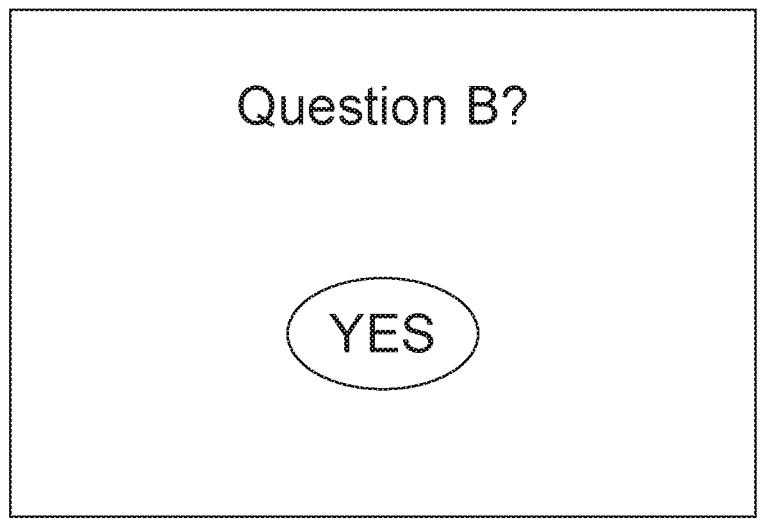
*FIG. 4D*

| User Interface (square, [A,B]) | User interface (square, [B, A]) | User interface (elliptical, [A,B]) | User interface (elliptical, [B, A]) |
|---|---|---|---|
| F(male, US, iPhone) = 56% | F(male, US, iPhone) = 32% | F(male, US, iPhone) = 36% | F(male, US, iPhone) = 41% |
| F(female, US, iPhone) = 52% | F(female, US, iPhone) = 63% | F(female, US, iPhone) = 56% | F(female, US, iPhone) = 72% |
| F(male, Canada, iPhone) = 27% | F(male, Canada, iPhone) = 37% | F(male, Canada, iPhone) = 73% | F(male, Canada, iPhone) = 52% |
| F(female, Canada, iPhone) = 43% | F(female, Canada, iPhone) = 61% | F(female, Canada, iPhone) = 56% | F(female, Canada, iPhone) = 65% |
| F(male, US, Android) = 78% | F(male, US, Android) = 52% | F(male, US, Android) = 64% | F(male, US, Android) = 31% |
| F(female, US) = 47% | F(female, US) = 48% | F(female, US) = 52% | F(female, US) = 58% |
| F(male, Canada, Android) = 73% | F(male, Canada, Android) = 21% | F(male, Canada, Android) = 45% | F(male, Canada, Android) = 32% |
| F(female, Canada, Android) = 45% | F(female, Canada, Android) = 52% | F(female, Canada, Android) = 50% | F(female, Canada, Android) = 61% |

*FIG. 6*

Interface rules:

{gender=female} => {elliptical yes button, [B,A] question order}

{gender=male, market=US} => {square yes button, [A,B] question order}

{market=Canada, browser=firefox} => {green submit button}

{device=Android, language=English} => {friend message font size 11 pts}

{device=iPhone, gender=female, age<20} => {pink background color}

...

User attribute frequency:

| | |
|---|---|
| market | 18 |
| gender | 15 |
| device | 9 |
| browser | 5 |

*FIG. 7*

Interface rules:

{gender=female} => {elliptical yes button, [B,A] question order}

{gender=male, market=US} => {square yes button, [A,B] question order}

{market=Canada, browser=firefox} => {green submit button}

{device=Android, language=English} => {message font size 14 pts}

{device=PC} => {message font size 11 pts}

{device=iPhone, gender=female, age<20} => {pink background color}

User attribute-interface feature correlation map:

| User attribute | Interface feature | Frequency |
| --- | --- | --- |
| market | submit button | 4 |
| market | message font | 2 |
| gender | background color | 3 |
| gender | submit button | 2 |
| age | background color | 1 |
| device | message font size | 2 |
| browser | contact import | 1 |

*FIG. 8*

ADAPTIVE USER INTERFACE USING MACHINE LEARNING MODEL

CROSS-REFERENCE TO RELATED APPLICATIONS

This application is a continuation of U.S. patent application Ser. No. 13/612,554, entitled "ADAPTIVE USER INTERFACE USING MACHINE LEARNING MODEL," filed on Sep. 12, 2012, which is incorporated herein by reference in its entirety.

FIELD OF THE INVENTION

This invention relates generally to social networking, and in particular to methods and systems for testing and applying user interface features of a social networking system using machine learning models.

BACKGROUND

Modern social networking systems are interactive and support frequent user inputs throughout the operation of the social networking system. There is a growing emphasis in social network development on user interfaces designed to ease communication between the system and humans.

However, one drawback of existing social networking interfaces is that they have little ability to take into account differences in the preferences, style, and knowledge of the users of the social networking systems. A social networking system can let a user select from a set of default styles and even store a user's own interface variations, but the latter process is manual and tedious. Clearly, there is a need for increased personalization in the area of user interface for the social networking system. The level of personalization needs to increase not only in the types of flexibility but also in the way that the personalization occurs. Currently, most social networking systems require that users determine or select their preferences explicitly to the user interface, which means the options are either limited in number or tiresome to complete. Moreover, some facets of user style or user preference may be reflected in users' behavior but not subject to conscious inspection.

The suboptimal user interface of the existing social networking systems can cause difficulty, distraction, or frustration for the users. As a result, the social networking systems see lower conversion rate from the users. For example, a user may find the registration process tedious and give up. Or a user may ignore a friend message popped up on the upper right corner of the window since this user is used to focusing on the left portion of the web page. Or a user may refuse to click an advertisement link because the advertisement is bordered by a thick black square block which has an unpleasant meaning in that user's culture. To achieve better conversion rates, social networking systems constantly run user interface tests to experiment with new interface features. If a new feature wins an A/B test against an existing feature, the new feature will replace the existing feature in the user interface. However, these interface test procedures lack consideration of users' personal style and are not adaptive to the ever-changing trend of user population inclination.

SUMMARY

The technology introduced here uses machine learning models to test and optimize user interfaces of a social networking system, based on the observation of user activity on the test user interfaces. The social networking system presents new features for the user interfaces to a group of test users and collects responses from the test users. The social networking system performs analytics on the response data to assess how the new features works in view of groups of users who have different user attributes (e.g. country, gender, age, etc.) from other groups. The assessing is based on one or more metrics (e.g. a conversion rate) calculated from the user responses. Using Machine Learning algorithms, the social networking system determines the markets (or other attributes) of which users the new feature or sequencing of flow works best for.

The technology enables the social networking system to personalize the user interfaces based on the empirical user data. The personalization occurs automatically without the intervention of the users. The system can even recognize subtle preferences reflected from users' behaviors and determine user preferences accordingly. The technology optimizes the user interfaces of the social networking system based on user groups with different user attributes and maximizes the target metrics such as a conversion rate. Further the technology is adaptive to the trend of user group preferences since the machine learning model can periodically update the interface rule of applying user interface features.

The technology utilizes machine learning models to minimize the number of interface rules and variations of the rules. The technology is capable of determining an optimal set of the interface rules for any user based on the user attributes.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

FIG. 3 shows calculated metrics of registration success rates after an analytic process.

FIGS. 4A-4D illustrate versions of a user interface for a social network with different features for testing.

FIG. 6 shows calculated metrics of conversion rates after the analytic process in FIG. 5.

FIG. 7 illustrates a sample content of a database for storing interface rules and attributes frequencies that a social networking system maintains.

FIG. 8 illustrates a sample content of a database for storing interface rules and attributes-features correlation that a social networking system maintains.

DETAILED DESCRIPTION

References in this specification to "an embodiment," "one embodiment," or the like, mean that the particular feature, structure, or characteristic being described is included in at least one embodiment of the present invention. All occurrences of such phrases in this specification do not necessarily refer to the same embodiment.

Figure 1:
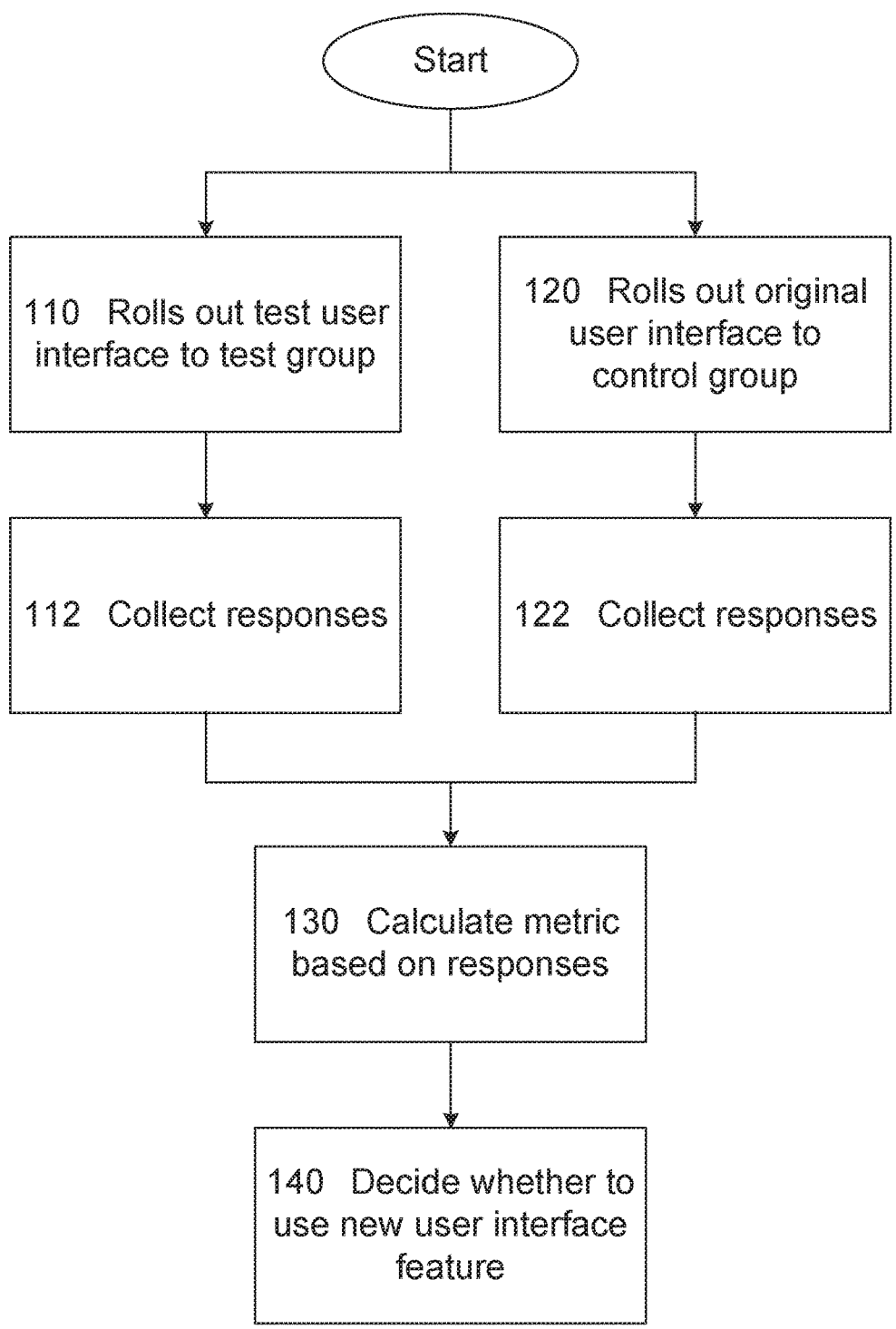
FIG. 1 illustrates a high level block diagram of a conventional process for testing a user interface feature for a social networking system.

FIG. 1 illustrates a high level block diagram of a conventional process for testing a user interface feature for a social networking system. The social networking system runs A/B tests to test whether the new user interface feature will perform better than the original feature for certain goals. For example, the goal can be optimizing a conversion rate for an advertisement link. In the example, the feature under the test is the color of a button. The original color of the button is grey; the new user interface contains a white button.

The social networking system can select a test group of test users to test the new feature of the white button. In addition, the social networking system also selects a control group of control users to experience the original user interface of the grey button. The test group and the control group of users are randomly selected to be representative of the same user population.

At 110, the social networking system rolls out the test user interface with the new feature, i.e. an advertisement link with a white button, to the test group of test users. Then at step 112, the social networking system collects responses from the test users. The responses include information of whether the test users click the white button to access the advertisement. Similarly at 120, the social networking system presents the original advertisement link with a grey button to the control group of control users. At 122, the social networking system collects the responses from the control users, including information of whether the control users click the grey button to access the advertisement.

Then at 130, the social networking system calculates the metrics of the conversion rate for the whole test group of test users and the whole control group of control users, respectively. A comparison of the calculated metrics for the test group and the control group leads to a decision 140 of whether to replace the original grey button with the new white button in the user interface for all users. Thus overall, the test improves the metric of conversion rate for the entire user population. However, the interface test illustrated in FIG. 1 lacks consideration of users' personal styles and does not optimize the metric of conversion rate on a personal level.

Figure 2:
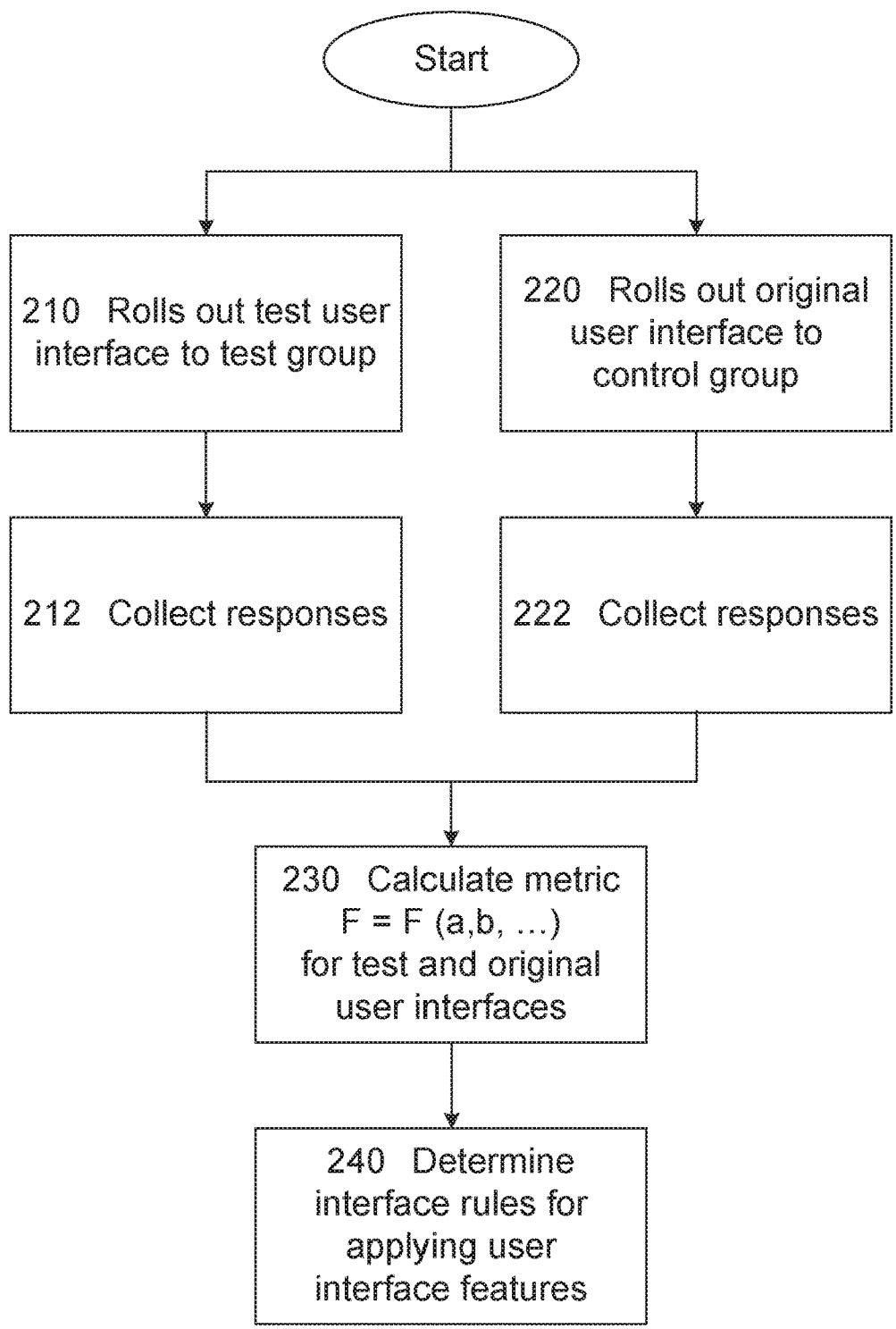
FIG. 2 illustrates a high level block diagram of a process for testing a user interface feature of a social networking system according to one embodiment of the present invention.

FIG. 2 illustrates a high level block diagram of a process for testing a user interface feature of a social networking system, in accordance with one embodiment. The social networking system runs user interface tests to assess which variations on user interface features will perform best for certain goals. The user interface features can include, but are not limited to, a property of a user interface element, a user interface element, a sequence of interface flow, a user interface text, or a combination thereof. A feature is not necessarily a visual feature. The goal is to optimize or maximize a metric. The metric can be, but not limited to, a conversion rate, a registration success rate, a time period that a user spends on the user interface, an advertisement click rate, a newsletter subscription rate, or a download rate. A conversion rate is a ratio of users who covert casual content views into desired actions.

The goal of the process shown in FIG. 2 is to optimize the user registration interface, in order to maximize the registration success rate, i.e. the percentage of the users loading the registration form who actually click the submit button and finish the registration process. The feature under the test is the color of the submit button. The original color of the submit button is blue, and by contrast, the new user interface contains a green submit button.

The social networking system randomly selects a test group of test users to test the new feature of a green submit button. In addition, the social networking system randomly selects a control group of control users to experience the original user interface with a blue submit button. The test group and the control group of users are randomly selected to be representative of the same user population. The sizes of the test group and the control group are large enough so that the test result has a statistical significance and can be extrapolated to the rest of the user population. In one embodiment, the sizes of the test group and the control group are substantially the same.

At 210, the social networking system rolls out the user registration form with a green submit button (the new feature) to a test group of test users. Then at step 212, the social networking system collects responses from the test users. The responses include information on whether the test users click the green submit button to successfully submit the user registration form. Similarly at 220, the social networking system presents the original user registration form with a blue submit button to the control group of control users. At 222, the social networking system collects the responses from the control users, including information on whether the control users click the blue submit button to successfully submit the original user registration form.

Although the metrics of a registration success rate can be calculated for the whole test group of test users and the whole control group of control users, such a comparison only leads to a decision of whether to replace the original blue submit button with the new green submit button in the user interface for all users. Further analysis can be performed based on the user attributes, leading to custom configured user experience.

As shown in step 230 of FIG. 2, the social networking system conducts analytics by calculating the metric F of a registration success rate for a plurality of subsets of users, each subset of users having different user attributes from other subsets. For example, the analytics can be conducted based on market (attribute a in FIG. 2) of the users and gender (attribute b in FIG. 2) of the users. For instance, a metric of a registration success rate is calculated for a subset of test users who are male and in US market and are experiencing the user interface with a green submit button. Similarly, a metric of a registration success rate is calculated for a subset of control users who are male and in US market and are experiencing the user interface with a blue submit button. By comparing these two metrics, the social networking system can draw a statistical significant conclusion of whether male users in the US market (a subset of users) prefer the green or blue submit button in the registration form interface.

Likewise, the social networking system can conduct similar analytics on other user attributes, including but not limited to, country, region, number of friends, user activeness, location, race, age, user language, user device, browser, disability, home ownership, income, employment, education, or other user attributes that are statistically representable by the sizes of the test group and the control group. For instance, country or market attributes are commonly used in analytics because social networks tend to be closely interconnected with a country or a market.

Once the social networking system has conducted the analytics for user subsets with different user attributes, the system contains knowledge of whether a subset of users who have particular user attributes prefers the original user interface or the testing user interface with new feature(s). At 240, using a machine learning model, based on the knowledge of analytics, the social networking system can determine an interface rule of applying user interface features for a user depending on one or more user attributes that are included for consideration in the analytics. In some embodiments, a plurality of interface rules are determined for user subsets with different attributes.

For example, FIG. 3 shows the calculated metrics of registration success rates after the analytics process 230 in FIG. 2. For male users in the US market (here assuming only two user attributes, market and gender, are considered by the machine learning model), by replacing the blue submit button on the registration form with the green submit button, the registration success rate increases from 56% to 60%. For female users in the US market, by replacing the blue submit button on the registration form with the green submit button, the registration success rate increases from 52% to 70%. For male users in the Canadian market, by replacing the blue submit button on the registration form with the green submit button, the registration success rate decreases from 58% to 55%. For female users in the Canadian market, by replacing the blue submit button on the registration form with the green submit button, the registration success rate decreases from 56% to 43%.

Based on the analyzed knowledge shown in FIG. 3, the social networking system can automatically determining one or more rules of how to apply user interface features depending on the user's attributes, using a machine learning model. For example, the social networking system can conclude from the analytics that users in the US market prefer the green submit button while users in the Canadian market prefer the blue submit button. The social networking system then can determine a rule that a green submit button is applied to the registration form for users in the US market: {market=US}=>{green submit button}, and another rule that a blue submit button is applied to the registration form for users in the Canadian market: {market=Canada}=>{blue submit button}.

In another embodiment, the social networking system can conclude from the analytics that male users do not have significant preferences on the colors of the submit button. Rather than gaining a marginal increase of the registration success rate, the system may decide to keep the default color of the submit button for consistent user experience for male users. The social networking system then can determine a rule that the color of submit button in the registration form is applied with default values for the user's market for all male users: {gender=male}=>{default color submit button}. In addition, the social networking system can further determine a rule that a green submit button is applied to the registration form for female users in the US market: {gender=female, market=US}=>{green submit button}, and another rule that a blue submit button is applied to the registration form for female users in the Canadian market: {gender=female, market=Canada}=>{blue submit button}.

These rules of applying user interface features are automatically determined by the social networking system using a machine learning model, without human operator intervention. The sizes of the test group and the control group are large enough so that the analytics results and rules are statistically significant for the entire user population that the test group and control group represent. These rules lead to a custom configured experience for users having different user attributes (e.g. different markets). Thus, the social networking system personalizes the user interface automatically based on the empirical user response data.

In one embodiment, the machine learning model automatically decides which user attribute makes statistical significance and is included in deciding the user interface. For instance, in FIG. 3, the machine learning model may decide for all male users, the attribute of markets is not significant attribute, since all male users in different markets show little interest in the color of the submit button. On the other hand, the machine learning model may decide for all female users, the attribute of markets is a significant attribute, since markets play an important role for female users on whether they prefer the green or blue submit button.

Similarly, the technology can be utilized in scenarios other than the registration process. For example, a mobile application running on a mobile device can benefit from a similar process to determine optimal GUI elements and sequences of flow for users of the mobile application. A website, including a social media website, can also use the technology disclosed herein to determine an optimal set of interface rules applied to its webpages based on user attributes.

The machine learning model can be any suitable model, such as decision tree learning, association rule learning, artificial neural network, genetic programming, inductive logic programming, support vector machines, clustering analysis, Bayesian network, reinforcement learning, representation learning, or sparse dictionary learning.

The technology can be further utilized to test multiple interface features in one test process. FIGS. 4A-4D illustrate versions of a user interface for a social network with different features for testing, in accordance with one embodiment. FIG. 4A illustrates a sample of an original user interface for the social network. The original user interface presents two questions, A and B, in two consecutive web pages for confirming a user agreement. Once a user clicks the square shape YES button on a first web page presenting the question A, the social networking system presents the user with a second web page with the question B. After the user further clicks the square shape YES button on the second web page, the user confirms that the user has read and agreed to comply with the user agreement.

FIG. 4B illustrates a sample of a user interface with a new interface feature. The new interface feature is a different sequence of interface flow. In FIG. 4B, the questions A and B are presented in a reversed order. The first web page presents the question B to the user. Once the user clicks the square shape YES button on a first web page presenting the question B, the social networking system presents the user with a second web page with the question A. After the user clicks the square shape YES button on the second web page, the user confirms that the user has read and agrees to comply with the user agreement.

FIG. 4C illustrates a sample of a user interface with a new interface feature. The new interface feature is an interface element having a different shape. In FIG. 4C, the YES button on both first and second web pages has an elliptical shape, instead of a square shape.

FIG. 4D illustrates a sample of a user interface with new interface features. The new interface features include a different sequence of interface flow and an interface element having a different shape. In FIG. 4D, the YES button on both first and second web pages has an elliptical shape, instead of a square shape. Further, the questions A and B are presented in reversed order. The first web page presents the question B to the user. Once the user clicks the elliptical shape YES button on a first web page presenting the question B, the social networking system presents the user with a second web page with the question A. After the user clicks the elliptical shape YES button on the second web page, the user confirms that the user has read and agrees to comply with the user agreement.

Figure 5:
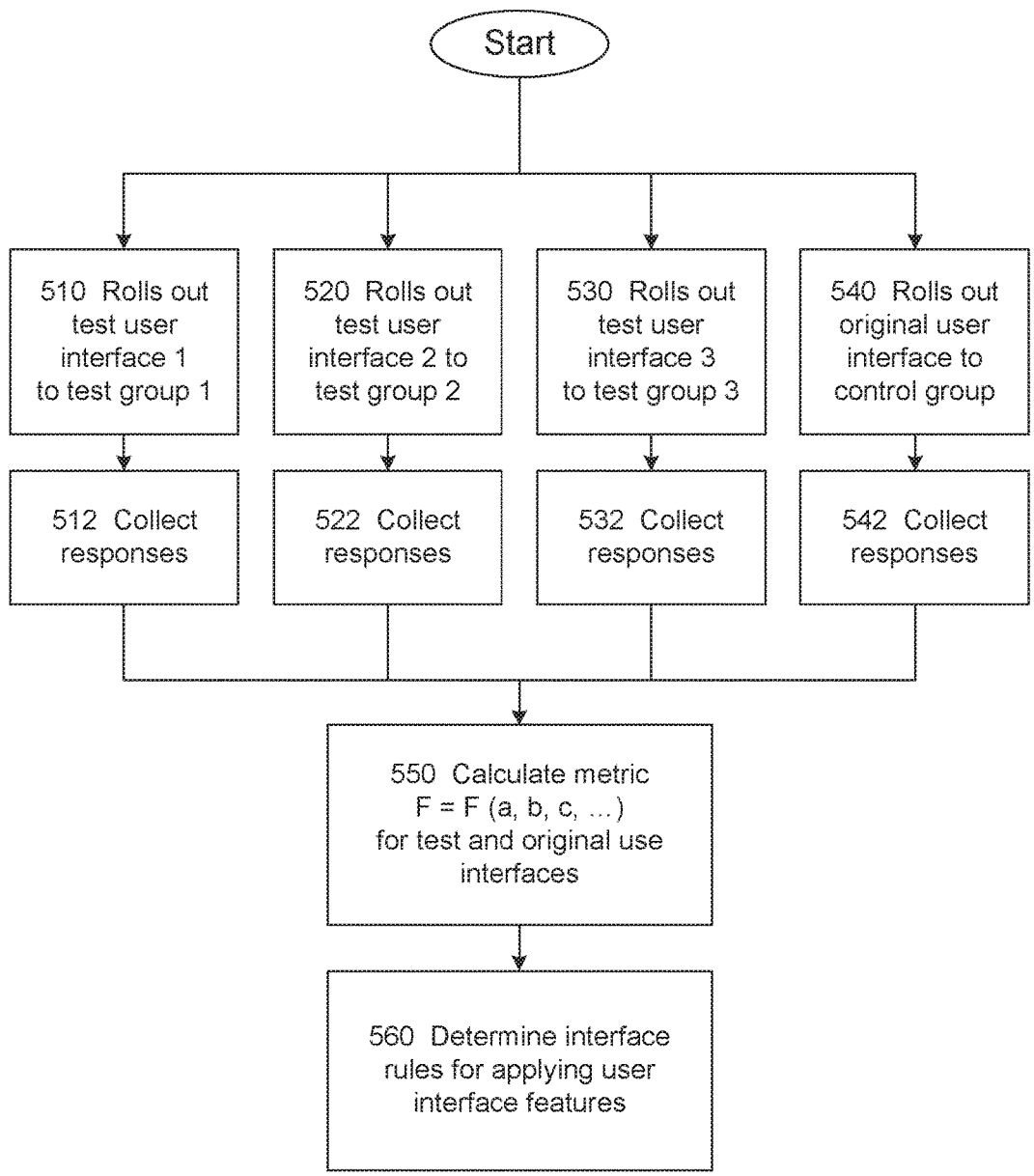
FIG. 5 illustrates a high level block diagram of a process for testing the user interfaces shown in FIGS. 4A-4D.

FIG. 5 illustrates a high level block diagram of a process for testing the user interfaces shown in FIGS. 4A-4D, in accordance with one embodiment. The features under the test include the sequence of interface flow for presenting questions A and B, and the shape of the YES button for the user to click to confirm the user agreement. In order to optimize the metric of conversion rate of users confirming the user agreement, the social networking system randomly selects users to form three test groups of test users to test the new interfaces with new feature(s). In addition, the social networking system randomly selects users to form a control group of control users to experience the original user interface. The test groups and the control group of users are randomly selected to be representative of the same user population. The sizes of the test groups and the control groups are large enough so that the test result has a statistical significance to be extrapolated to the rest of the user population.

At 510, the social networking system rolls out the new user interface 1 having a reversed sequence of interface flow as shown in FIG. 4B to the first test group of test users. Then at step 512, the social networking system collects responses from the test users. The responses include whether the test users click the OK button on second web page to confirm the user agreement. The social networking system also presents the new user interface 2 having elliptical shape OK buttons as shown in FIG. 4C to the second test group of test users at step 520. At step 522, the social networking system collects user responses, including whether the test users click the OK button on the second web page to confirm the user agreement.

The social networking system further presents the new user interface 3 having elliptical shape OK buttons and reversed sequence of interface flow as shown in FIG. 4D to the third test group of test users at step 530. At step 532, the social networking system collects user responses, including whether the test users click the OK button on the second web page to confirm the user agreement. Similarly at 540, the social networking system presents the original user interface as shown in FIG. 4A to the control group of control users. At 542, the social networking system collects the responses from the control users, including whether the test users click the OK button on the second web page to confirm the user agreement.

As shown in step 550 of FIG. 5, the social networking system conducts analytics by calculating the metrics F of the conversion rate for a plurality of subsets of users, each subset of users having different user attributes from other subsets. For example, the analytics can be conducted based on market (attribute a in FIG. 5), gender (attribute b in FIG. 5), and user device (attribute c in FIG. 5). For the purpose of analytics, the test groups and the control group are divided into subsets of users having different attributes. For each user interface that is being tested, the metrics of conversion rate are calculated for the subsets of users. Thus, the system contains knowledge of whether a subset of users having particular user attributes prefer the original user interface or a testing user interface with new feature(s).

The social networking system performs the division of user subsets in such a way that small sample sizes of subsets are avoided. If the social networking system identifies that different values of a particular user attribute can result in user subsets with such small sample sizes that the subsets lose statistical significance, the social networking system rearranges the division of subsets for the user attribute (e.g. combining users having multiple attribute values into one subset), or abandons that user attribute from interface rule generation.

By analyzing the calculated metrics, the social networking system selects attributes that have significant impacts on deciding the user interface features using a machine learning model. Based on the calculated metrics and selected attributes, at 560, the social networking system can determine one or more rules of applying user interface features for a user depending on one or more selected user attributes that are included for consideration in the analytics.

For example, FIG. 6 shows the calculated metrics of conversion rates after the analytics process 550 in FIG. 5. Using a machine learning model, the social networking system can deduct rules of applying different user interface to achieve customized interface for users, in order to maximize the conversion rate. For example, the machine learning model may discover that female users in general, regardless of market or user device, prefer the user interface with the elliptical submit button and [B, A] reversed order of sequence of flow. Accordingly, the social networking system determines a rule of {gender=female}=>{elliptical, [B,A]}; i.e. for a user whose gender is female, a user interface for confirming user agreement with elliptical submit button and [B, A] reversed order of sequence of flow is applied for the user, regardless the user's market or device.

Further, the machine learning model may discover that male users in the US market, regardless of the user device being iPhone or Android, prefer the user interface with the square submit button and [A, B] order of sequence of flow. Accordingly the social networking system determines a rule of {gender=male, market=US}=>{square, [A,B]}; i.e. for a user whose gender is male and who is in US market, a user interface for confirming user agreement with square submit button and [A, B] order of sequence of flow is applied for the user, regardless of the type of the user's device.

By applying these automatically customized rules of applying user interface, the conversion rate is maximized for each subset of users who have different user attributes. The social networking system automatically conducts the analytics and rule generation using a machine learning model without manual intervention from human operator. The inputs that the social networking system needs are new user interface features to be tested and an indication of which metric to be optimized. Once the inputs are received, the social networking system selects test group(s) and control group accordingly. Then the social networking system receives the user responses and calculating the target metrics based on the user responses for each subset of users having different attributes and for each test user interface. The social networking system analyzes the calculated metrics and determines rules of applying the user interface features using the machine learning model.

Unlike a conventional A/B test, the output of the procedure is not only a simple yes or no answer for whether to apply the new user interface feature for all users. Using a machine learning model, the social networking system is able to conduct an intelligent procedure and outputs rules about how to apply user interface features to different subsets of users, wherein each subset of users have different user attributes. In one embodiment, the output rules are human comprehensible and statistically significant for the user population, and therefore serve as useful guidelines for designing future user interface features.

The machine learning model automatically chooses which user attribute makes statistical significance on deciding the user interface features. For instance, based on the calculated metrics shown in FIG. 6, the machine learning model decides one rule based on the gender attribute and another rule based on the gender and market attributes, as discussed in previous paragraphs. In one embodiment, the social networking system further monitors and records the frequencies of user attributes occurring in the determined interface rules. The frequencies can be used to help the machine learning model to select attributes in future interface tests. The user attributes that frequently show up in interface rules, e.g. market attribute, can have higher priority than less frequent attributes when the machine learning model chooses attributes for determining interface rules.

FIG. 7 illustrates a sample content of a database for interface rules and attributes frequencies that a social networking system maintains, in accordance with one embodiment. The database 700 records the interface rules that are determined from interface tests. The social networking system counts the frequencies of attributes occurring in the recorded interface rules. Then, the database 700 further records the frequency of each attribute. In some embodiments, the frequencies of the user attributes may be used by the machine learning model when determining the order of attributes to be considered for interface rules.

In some embodiments, the database 700 can record the target metrics along with the interface rules as well. For example, one interface rule can be used to optimize the metric of registration success rate; another interface rule can be used to optimize the metric of advertisement conversion rate. The social networking system can choose to apply certain interface rules for a certain metric to optimize the target metric.

Further, the social networking system may monitor and record not only the frequencies of the user attributes, but also the types of interface features that the user attributes are associated with in interface rules. For example, FIG. 8 illustrates a sample content of a database for interface rules and attributes-features correlation that a social networking system maintains, in accordance with one embodiment. The database 800 records the interface rules that are determined from conducted interface tests. For each pair of a user attribute and an interface feature, the social networking system counts the frequencies of the attribute-interface pair occurring in the same existing interface rule, and records the frequencies (as a correlation map) in the database 800 as shown in FIG. 8.

The higher the frequency, the more closely a pair of a user attribute and an interface feature are correlated. When the social networking system is conducting an interface test, the system identifies the types of features being tested in the interface test. Then the social networking system looks into its database to check if the types of interface features being tested have any close correlated user attributes. If the system finds any close correlated user attributes, the machine learning model will use these correlated user attributes in priority for determining the interface rules for applying the correlated features being tested.

For example, as shown in the database 800 in FIG. 8, the interface feature of background color is closely correlated to the user attribute gender. Further user attribute age is also correlated to the interface feature of background color. Therefore, when the social networking system is conducting an interface test related to the choice of background color, the machine learning model will first use the attributes of gender and age before other attributes for determining the interface rules for applying the background color(s) being tested. This procedure creates a bias toward the correlated attributes that are predictive of optimizing the target metric (e.g. conversion rate).

Furthermore, the database 800 shows that the interface feature of message font size is closely correlated to the user attribute of device. E.g. an Android users prefer bigger message font size than a PC user. When the social networking system is conducting an interface test related to the choice of message font size, the machine learning model will first use the attribute of device before other attributes for determining the interface rules for applying the message font size(s) being tested.

When the user attributes of a user are changed, manually by the user or automatically by the system, the social networking system automatically applies suitable user interface for the user, based on the new user attributes. For example, when a user travels to Canada and uses an Android cell phone designed for a Canadian cellular phone network to access a social network, the social networking system identifies interface rules in its database that match the new attributes (e.g. market=Canada, device=Android) and apply user interface for the user according to the identified interface rules.

The user attributes may have interdependencies upon each other. By using a machine learning model, there is no need to remove interdependencies by excluding user attributes from interface rules. The machine learning model can consider all available user attributes and automatically generate rules for optimizing the target metric that is predetermined by an administrator or operator of the social networking system.

Figure 9:
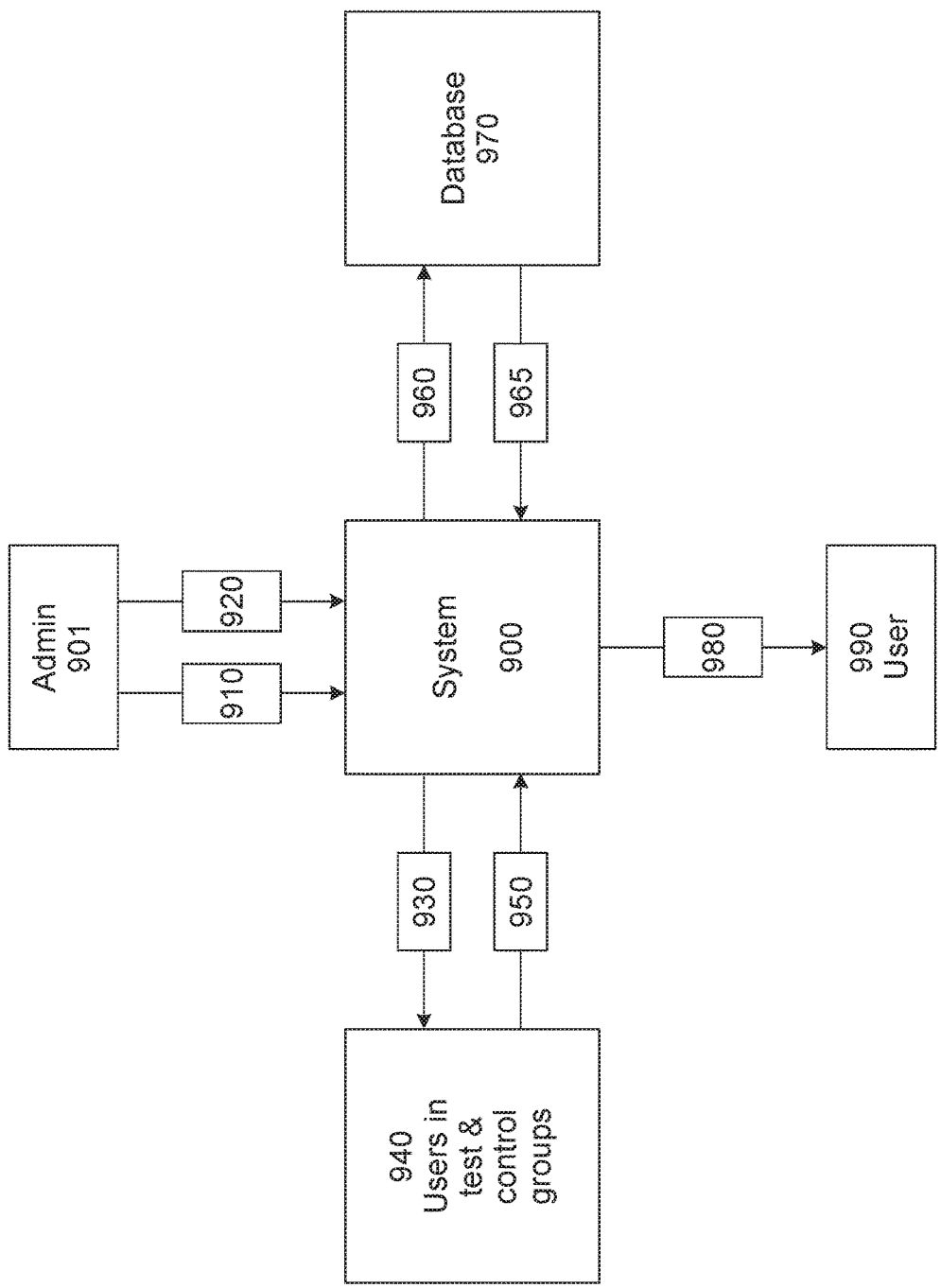
FIG. 9 illustrates a block diagram for inputs and outputs of an interface testing process.

FIG. 9 illustrates a block diagram for inputs and outputs of an interface testing process, in accordance with one embodiment. An administrator or operator 901 of the social networking system provides inputs that the social networking system needs for the interface test. The inputs include new user interface features 910 to be tested and information 920 about which metric to be optimized. The social networking system 900 receives the inputs 910 and 920 and selects test group(s) and control group accordingly. The social networking system 900 supplies test user interfaces 930 to users in test group(s) and control group 940 and collects the user responses 950. The system calculates the target metrics based on the user responses for each subset of users having different attributes and for each tested user interface. Then, the social networking system analyzes the calculated metrics and determines interface rules of applying the user interface features using a machine learning model. The social networking system outputs the interface rules 960 and records the rules in its database 970. When a user 990 accesses the social network, the social networking system 900 identifies and retrieves related interface rules from the database 970, and sends the user interface 980 according to the interface rules to the user 990.

The social networking system can be implemented on a computer or a cluster of computers (also referred to as nodes), such as a Hadoop cluster. The Hadoop cluster can include a plurality of nodes that communicate with each other through an interconnect. The interconnect may be, for example, a local area network (LAN), wide area network (WAN), metropolitan area network (MAN), global area network such as the Internet, a Fibre Channel fabric, or any combination of such interconnects. In some embodiments, the interconnect can include a network switch for processing and routing data between the nodes under network protocols, including TCP/IP. Each of the nodes may be, for example, a server, a conventional personal computer (PC), server-class computer, workstation, handheld computing/communication device, or the like. In some embodiments, the cluster is implemented using one or more racks of commodity-class servers.

Figure 10:
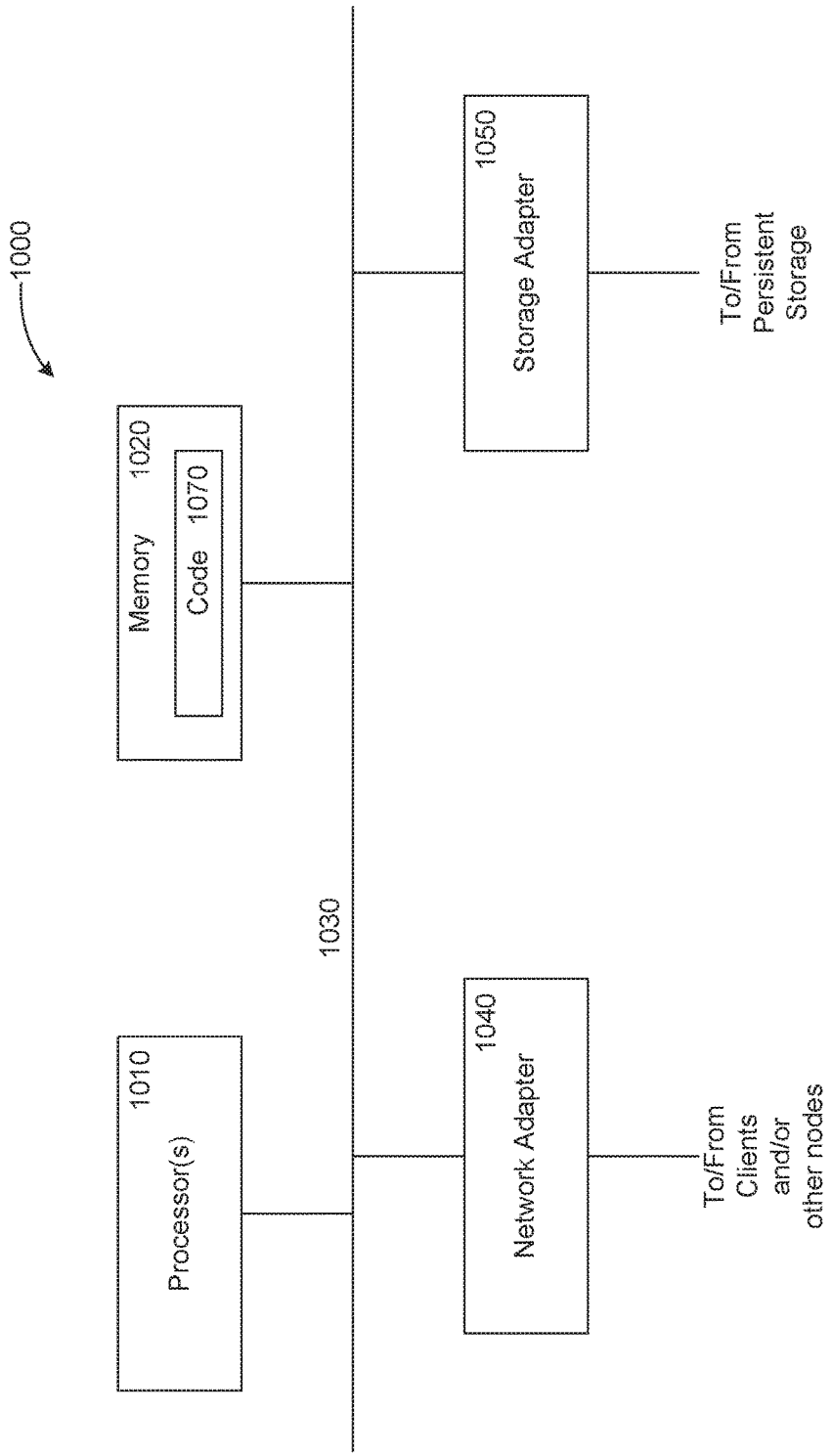
FIG. 10 is a high-level block diagram showing an example of the architecture of a node, which may represent any node in a cluster on which a social networking system described herein runs.

FIG. 10 is a high-level block diagram showing an example of the architecture of a node, which may represent any node in a cluster on which a social networking system described herein runs. The node 1000 includes one or more processors 1010 and memory 1020 coupled to an interconnect 1030. The interconnect 1030 shown in FIG. 10 is an abstraction that represents any one or more separate physical buses, point to point connections, or both connected by appropriate bridges, adapters, or controllers. The interconnect 1030, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1010 is/are the central processing unit (CPU) of the storage controller 1000 and, thus, control the overall operation of the node 1000. In certain embodiments, the processor(s) 1010 accomplish this by executing software or firmware stored in memory 1020. The processor(s) 1010 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1020 is or includes the main memory of the node 1000. The memory 1020 represents any form of random access memory (RAM), read-only memory (ROM), flash memory, or the like, or a combination of such devices. In use, the memory 1020 may contain, among other things, code 1070 embodying at least a portion of procedures disclosed in previous paragraphs. Code 1070 may also include an analytic module stored in the memory that is executable by the processor to select a plurality of subsets of test users, wherein each of the subsets includes test users having different user attributes from other subsets of test users, and to calculate a metric for each of the test user interfaces and for each of the subsets. Code 1070 may also include a machine learning model module stored in the memory that is executable by the processor to generate at least one interface rule associated with at least one associated user interface feature and at least one associated user attribute so that the metric for users who have the associated user attribute is optimized.

Also connected to the processor(s) 1010 through the interconnect 1030 are a network adapter 1040 and a storage adapter 1050. The network adapter 1040 provides the node 1000 with the ability to communicate with remote devices, over a network and may be, for example, an Ethernet adapter or Fibre Channel adapter. The network adapter 1040 may also provide the node 1000 with the ability to communicate with other nodes within the cluster. In some embodiments, a node may use more than one network adapter to deal with the communications within and outside of the cluster separately. The storage adapter 1050 allows the node 1000 to access a persistent storage, and may be, for example, a Fibre Channel adapter or SCSI adapter.

The code 1070 stored in memory 1020 may be implemented as software and/or firmware to program the processor(s) 1010 to carry out actions described above. In certain embodiments, such software or firmware may be initially provided to the node 1000 by downloading it from a remote system through the node 1000 (e.g., via network adapter 1040).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A computer implemented method comprising:
    storing one or more interface rules;
    receiving an indication of a metric value to be optimized;
    presenting a user interface including a user interface feature to a group of users of a social networking system;
    collecting response data from the users experiencing the user interface;
    determining a plurality of attribute values for a user attribute of the group of users of the social networking system;
    for each attribute value of the plurality of attribute values, calculating a value of the metric value for a subset of the group of users of the social networking system who have the user attribute of that attribute value, based on the response data;
    analyzing using a machine learning model the values of the metric value for the subsets of the group of users of the social networking system;
    identifying a list of frequently occurring user attributes by examining stored interface rules; and generating at least one interface rule of applying the user interface feature, wherein the at least one interface rule comprises a type of the user interface feature and a feature value appropriately associated with the type of the user interface feature, wherein the at least one interface rule is generated based on a frequently occurring user attribute from the list of the frequently occurring user attributes and a user attribute closely correlated to the user interface feature, and wherein the type of the user interface feature and the feature value appropriately associated with the type of the user interface feature are generated based on the analysis of the machine learning model so that the metric value is optimized.

2. The computer implemented method of claim 1, further comprising:
generating a correlation map between user interface features and user attributes by examining stored interface rules;
wherein the user attribute closely correlated to the user interface feature is determined according to the correlation map.

3. The computer implemented method of claim 2, wherein the correlation map records frequencies of pairs of user attributes and interface features occurring in the stored interface rules, and wherein each frequency indicates a level of correlation between a user attribute and an interface feature of a corresponding pair.

4. The computer implemented method of claim 1, wherein the metric value is a conversion rate, a registration success rate, a time user spending on user interface, an advertisement click rate, a newsletter subscription rate, or a download rate.

5. The computer implemented method of claim 1, wherein the user interface features include at least one of user interface element, sequence of interface flow, or user interface text.

6. The computer implemented method of claim 1, further comprising:
presenting an original user interface including an original user interface feature to a group of control users; and
collecting response data from the control users experiencing the original user interface.

7. The computer implemented method of claim 1, wherein the response data includes data of user inputs.

8. The computer implemented method of claim 1, wherein the response data includes time which users spend on the user interface.

9. The computer implemented method of claim 1, further comprising:
randomly selecting a plurality of users as a group of test users.

10. The computer implemented method of claim 1, wherein the interface rule of applying user interface features is a decision rule that is human comprehensible.

11. The computer implemented method of claim 1, wherein the group of users of the social networking system has such a size that the interface rule is statistically significant for a population of users.

12. The computer implemented method of claim 1, wherein the presenting comprises:
presenting a plurality of user interfaces to a plurality groups of test users, each user interface of the plurality of user interfaces including at least one new user interface feature.

13. The computer implemented method of claim 1, further comprising:

storing the interface rule;
generating a user interface according to the interface rule; and
presenting the user interface to a user, wherein the user is associated with an attribute value that matches an attribute value associated with the interface rule.

14. One or more computer-readable non-transitory storage media embodying software that is operable when executed to:
store one or more interface rules;
receive an indication of a metric value to be optimized;
present a user interface including a user interface feature to a group of users of a social networking system;
collect response data from the users experiencing the user interface;
determine a plurality of attribute values for a user attribute of the group of users of the social networking system;
for each attribute value of the plurality of attribute values, calculate a value of the metric value for a subset of the group of users of the social networking system who have the user attribute of that attribute value, based on the response data;
analyze using a machine learning model the values of the metric value for the subsets of the group of users of the social networking system;
identify a list of frequently occurring user attributes by examining stored interface rules; and
generate at least one interface rule of applying the user interface feature, wherein the at least one interface rule comprises a type of the user interface feature and a feature value appropriately associated with the type of the user interface feature, wherein the at least one interface rule is generated based on a frequently occurring user attribute from the list of the frequently occurring user attributes and a user attribute closely correlated to the user interface feature, and wherein the type of the user interface feature and the feature value appropriately associated with the type of the user interface feature are generated based on the analysis of the machine learning model so that the metric value is optimized.

15. A system comprising: one or more processors; and a memory coupled to the processors comprising instructions executable by the processors, the processors operable when executing the instructions to:
store one or more interface rules;
receive an indication of a metric value to be optimized;
present a user interface including a user interface feature to a group of users of a social networking system;
collect response data from the users experiencing the user interface;
determine a plurality of attribute values for a user attribute of the group of users of the social networking system;
for each attribute value of the plurality of attribute values, calculate a value of the metric value for a subset of the group of users of the social networking system who have the user attribute of that attribute value, based on the response data;
analyze using a machine learning model the values of the metric value for the subsets of the group of users of the social networking system;
identify a list of frequently occurring user attributes by examining stored interface rules; and
generate at least one interface rule of applying the user interface feature, wherein the at least one interface rule comprises a type of the user interface feature and a feature value appropriately associated with the type of the user interface feature, wherein the at least one interface rule is generated based on a frequently occurring user attribute from the list of the frequently occurring user attributes and a user attribute closely correlated to the user interface feature, and wherein the type of the user interface feature and the feature value appropriately associated with the type of the user interface feature are generated based on the analysis of the machine learning model so that the metric value is optimized.

* * * * *